United States Patent
Yin et al.

(10) Patent No.: US 12,499,446 B2
(45) Date of Patent: Dec. 16, 2025

(54) CARD SKIMMING DETECTION

(71) Applicant: Capital One Services, LLC, McLean, VA (US)

(72) Inventors: Benjamin Yin, McLean, VA (US); Geeta Shyamala, Herndon, VA (US); Nahid Farhady Ghalaty, Fairfax, VA (US)

(73) Assignee: Capital One Services, LLC, McLean, VA (US)

(*) Notice: Subject to any disclaimer, the term of this patent is extended or adjusted under 35 U.S.C. 154(b) by 248 days.

(21) Appl. No.: 17/808,005

(22) Filed: Jun. 21, 2022

(65) Prior Publication Data

US 2023/0410114 A1    Dec. 21, 2023

(51) Int. Cl.
*G06Q 20/40* (2012.01)
*G06K 7/08* (2006.01)

(52) U.S. Cl.
CPC ......... *G06Q 20/4016* (2013.01); *G06K 7/087* (2013.01)

(58) Field of Classification Search
CPC .... G06Q 20/4016; G06Q 20/18; G06Q 20/20; G06Q 20/341; G06Q 20/3563; G06Q 20/357; G06K 7/087; G07F 19/20; G07F 19/2055
See application file for complete search history.

(56) References Cited

U.S. PATENT DOCUMENTS

| | | | |
|---|---|---|---|
| 7,036,731 B2* | 5/2006 | Isono | G06K 7/0026 235/493 |
| 10,572,698 B1* | 2/2020 | Keener | G06K 7/0095 |
| 10,936,928 B2* | 3/2021 | Scaife | G06K 19/07309 |
| 2014/0263646 A1* | 9/2014 | Manesh | G06K 7/084 235/440 |

(Continued)

FOREIGN PATENT DOCUMENTS

| | | | | |
|---|---|---|---|---|
| EP | 3471041 A1 * | 4/2019 | | A61B 5/112 |
| WO | WO-2012151651 A1 * | 11/2012 | | G07F 19/207 |
| WO | WO-2017127874 A1 * | 8/2017 | | G06Q 20/3278 |

OTHER PUBLICATIONS

M. M. K. Al Rawahi and S. S. K. Nair, "Detecting skimming devices in ATM through image processing," 2015 IEEE/ACS 12th International Conference of Computer Systems and Applications (AICCSA), Marrakech, Morocco, 2015, pp. 1-5, doi: 10.1109/AICCSA.2015.7507139. (Year: 2015).*

(Continued)

*Primary Examiner* — Elda G Milef
(74) *Attorney, Agent, or Firm* — Harrity & Harrity, LLP (57) ABSTRACT

In some implementations, a physical medium for card skimming detection may include a magnetic stripe, on which account information associated with a user account may be stored, one or more sensors configured to detect when information is read from the magnetic stripe, and a processor. The physical medium may detect a first read and a second read of the magnetic stripe. The physical medium (Continued)

may determine that the first read and the second read occur within a time threshold of each other. The physical medium may transmit, to a device and based on determining that the first read and the second read occur with the time threshold of each other, an alert signal indicating a potential threat associated with the user account.

20 Claims, 8 Drawing Sheets

(56) References Cited

U.S. PATENT DOCUMENTS

| | | | | |
|---|---|---|---|---|
| 2016/0171361 | A1* | 6/2016 | Chatterton | G06F 21/77 |
| | | | | 705/41 |
| 2018/0005227 | A1* | 1/2018 | Sandeløv | G06Q 20/20 |
| 2019/0147447 | A1* | 5/2019 | McIntyre | G06Q 20/341 |
| | | | | 705/41 |
| 2020/0043010 | A1* | 2/2020 | Kwatra | G06Q 20/40145 |
| 2022/0245617 | A1* | 8/2022 | Momose | G06Q 20/341 |

OTHER PUBLICATIONS

"Hunter Cat—Card Skimmer Detector—Lab 401," Website: https://lab401.com/products/hunter-cat-card-skimmer-detector, Obtained Jun. 21, 2022, 6 Pages.

\* cited by examiner

CARD SKIMMING DETECTION

BACKGROUND

Skimming is the theft of personal information (e.g., from a transaction card), which has been used in an otherwise normal transaction. Skimming of a transaction card is often performed using a skimming device that is inserted into a card reader of a terminal. When a user swipes or inserts the transaction card in the card reader, the skimming device may scan and read the personal information from the transaction card. Some skimming devices may require the stolen personal information to be manually retrieved from the skimming device, while other skimming devices may allow for the personal information to be remotely obtained. Examples of locations at which skimming of transaction cards commonly occurs are automatic teller machines (ATMs) and gas pumps.

SUMMARY

Some implementations described herein relate to a system for card skimming detection. The system may include a physical medium that includes a magnetic stripe on which account information associated with a user account is stored, one or more sensors configured to detect when information is read from the magnetic stripe, and a processor. The physical medium may be configured to detect a first read of the magnetic stripe. The physical medium may be configured to detect a second read of the magnetic stripe. The physical medium may be configured to determine that the first read and the second read occur within a time threshold of each other. The physical medium may be configured to transmit, to a device and based on determining that the first read and the second read occur within the time threshold of each other, an alert signal indicating a potential threat associated with the user account. The system may include a processing system that includes one or more memories and one or more processors communicatively coupled to the one or more memories. The one or more processors may be configured to receive, from the device, the alert signal. The one or more processors may be configured to perform an action associated with the user account based on receiving the alert signal.

Some implementations described herein relate to a physical medium for card skimming detection. The physical medium may include a magnetic stripe on which account information associated with a user account is stored. The physical medium may include one or more sensors configured to detect when information is read from the magnetic stripe. The physical medium may include a processor. The processor may be configured to receive a first signal from the one or more sensors indicating a first read of the magnetic stripe. The processor may be configured to receive a second signal from the one or more sensors indicating a second read of the magnetic stripe. The processor may be configured to determine if the first read and the second read occur within a time threshold of each other. The processor may be configured to transmit, to a device and based on determining that the first read and the second read occur within the time threshold of each other, an alert signal indicating a potential threat associated with the user account.

Some implementations described herein relate to a method of card skimming detection. The method may include receiving, from a device and by a system having one or more processors, an alert signal indicating a potential threat associated with a user account, wherein the potential threat is based on multiple reads of a magnetic stripe of a physical medium associated with the user account, and wherein the multiple reads occur within a time threshold of each other. The method may include performing, by the system, an action associated with the user account based on receiving the alert signal.

DETAILED DESCRIPTION

The following detailed description of example implementations refers to the accompanying drawings. The same reference numbers in different drawings may identify the same or similar elements.

In some scenarios, a user may perform an interaction at a terminal (e.g., an automated teller machine (ATM) or a gas pump). In such an interaction, the user may have to swipe or insert a physical medium (e.g., a transaction card), which may be associated with a user account of the user, through or into a card reader of the terminal. The card reader may scan account information (e.g., user name, account number, expiration date, and/or card verification code) from the physical medium (e.g., from a magnetic stripe of the physical medium), and the interaction ultimately may be authorized by a back-end system (e.g., of a financial institution associated with the user account). In some scenarios, the terminal may have a card skimming device that may scan and read the account information from the magnetic stripe. A person who retrieves the account information from the card skimming device may have unauthorized access to and use of the user account (e.g., funds in the user account). However, the user of the user account may not become aware of such unauthorized access and use until some time later. Because of the delayed nature of the user's notice, some actions performed as a result of the unauthorized access and use may require a lot of time and resources (e.g., by the user and the financial institution) to remedy or reverse the actions, if even possible. Such remedial action may require substantial computing resources, which would otherwise have been unnecessary but for the unauthorized access and use of the user account via the card skimming. Accordingly, it is desirable to have a system that is able to timely detect card skimming and take immediate action to prevent or limit unauthorized access and use of a user account gained via card skimming.

Some implementations described herein relate to a system that detects card skimming as it occurs. The system may include a physical medium that has one or more sensors that are configured to detect when a magnetic stripe of the physical medium is read (e.g., when the physical medium is swiped or inserted into a card reader of a terminal). When the physical medium detects two different reads of the magnetic stripe that occur within a time threshold of each other, the physical medium may determine that a potential threat to a user account associated with the physical medium has occurred. In response, the physical medium may transmit an alert signal to the terminal. The terminal may, in turn, transmit the alert signal to a processing system, which may perform one or more actions associated with the user account (e.g., locking the user account and/or notifying the user) to prevent or minimize the potential threat. Accordingly, by detecting the card skimming as it occurs, and timely performing actions to prevent unauthorized actions resulting from access to the user account via the card skimming, substantial time and computing resources may be conserved that otherwise may have been necessary to reverse or remedy such unauthorized actions.

FIGS. 1A-1D are diagrams of an example implementation 100 associated with card skimming detection. As shown in FIGS. 1A-1D, example implementation 100 includes a physical medium, a terminal, a processing system, an account profile database, a user device, an interaction party device, and a law enforcement device. These devices are described in more detail below in connection with FIG. 2 and FIG. 3.

Figure 1A:
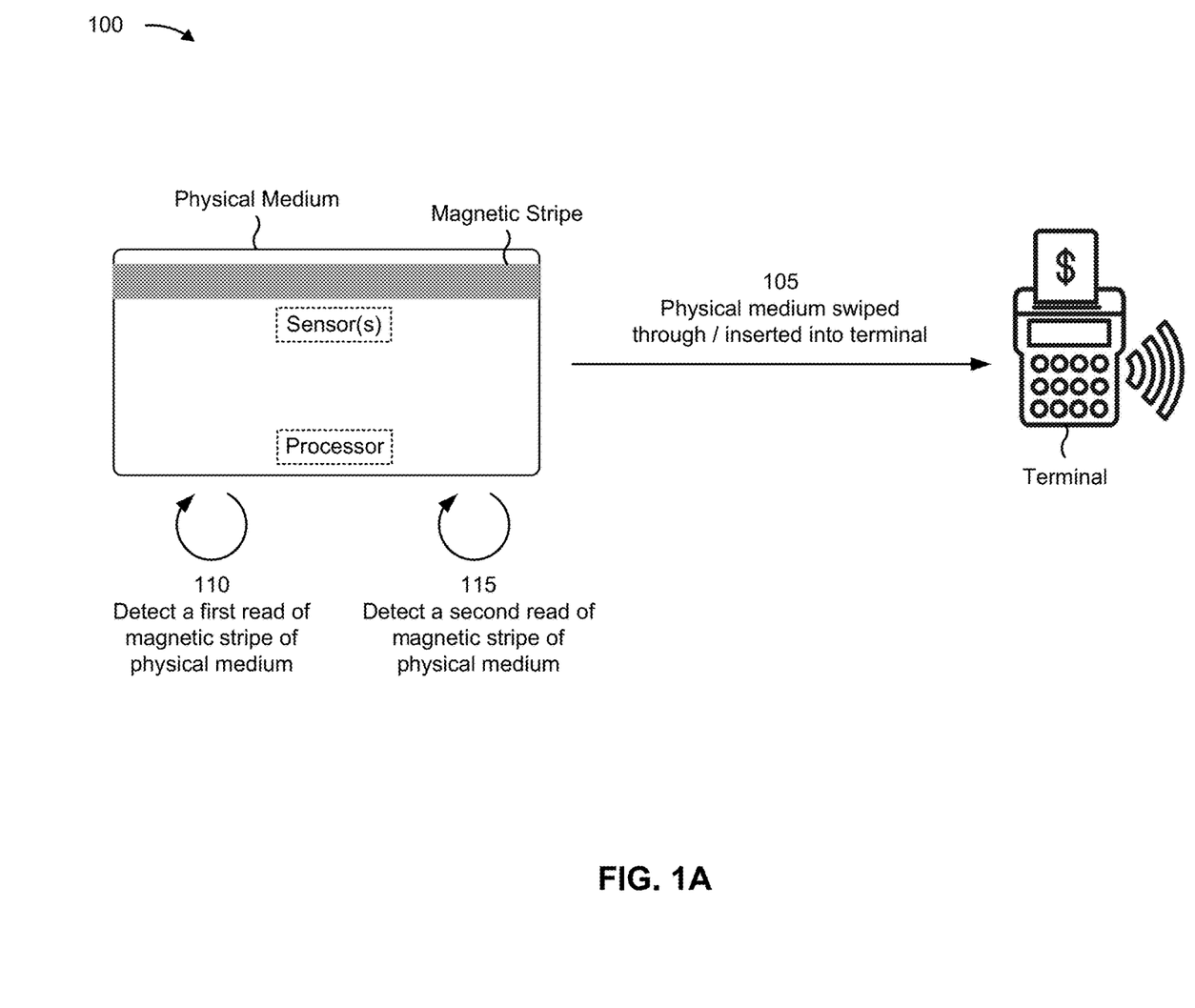
FIGS. 1A-1D are diagrams of an example implementation relating to card skimming detection, in accordance with some embodiments of the present disclosure.

As shown in FIG. 1A, a user (e.g., an authorized user of a user account, or an account holder) may use a physical medium, such as a transaction card (e.g., ATM card, debit card, credit card, or gift card), in connection with a terminal, such as an ATM, a gas pump, a kiosk machine, or a point-of-sale (PoS) terminal (e.g., at a restaurant, a store, or a retail location) to perform an interaction with an interaction party (e.g., a financial institution or a business) associated with the terminal. For example, as shown by reference number 105, the physical medium may be swiped through or inserted into a card reader of the terminal. The physical medium may include a magnetic stripe on one side of the physical medium. The magnetic stripe may store account information associated with the user account (e.g., the name of the user, an account number, an expiration date, a service code, and/or a card verification code). When the card is swiped through or inserted into the card reader, the card reader may read the magnetic stripe to obtain the account information.

As further shown in FIG. 1A, the physical medium also may include one or more sensors and a processor. The sensor(s) may be located on a same side of the physical medium as the magnetic stripe, and the sensor(s) may be arranged adjacent to the magnetic stripe. Alternatively, the sensor(s) may be arranged on top of the magnetic stripe. The sensor(s) may be configured to detect a read of the magnetic stripe (e.g., by a card reader and/or a card skimming device) and transmit, to the processor, a signal indicating the read of the magnetic stripe. For example, the sensor(s) may detect contact with or a proximity to the magnetic stripe by a device (e.g., the card reader and/or the card skimming device). As an example, the sensor(s) (e.g., a Hall sensor or a reed device) may be configured to detect a presence and/or magnitude of a magnetic field and/or changes in the magnetic field. Additionally, or alternatively, the sensor(s) may be configured to measure a voltage and/or capacitance, and to transmit, to the processor of the physical medium, a signal corresponding to the measurement of the voltage and/or capacitance. If a value of the measurement or a change in the value is above a threshold value, then the processor may determine that there was contact with the magnetic stripe and, therefore, that there was a read of the magnetic stripe.

As shown by reference number 110, the sensor(s) of the physical medium may detect a first read of the magnetic stripe. The sensor(s) may transmit, and the processor may receive, a first signal indicating the first read. As shown by reference number 115, the sensor(s) of the physical medium may detect a second read of the magnetic stripe. The sensor(s) may transmit, and the processor may receive, a second signal indicating the second read. In some implementations, the physical medium may include a first sensor that detects the first read, and a second sensor that detects the second read. For example, if the two sensor are or include respective reed switches, both reed switches being switched to closed states may indicate two reads of the magnetic stripe. As another example, the sensor(s) detecting asynchronous electromagnetic activity may indicate two reads of the magnetic stripe.

Figure 1B:
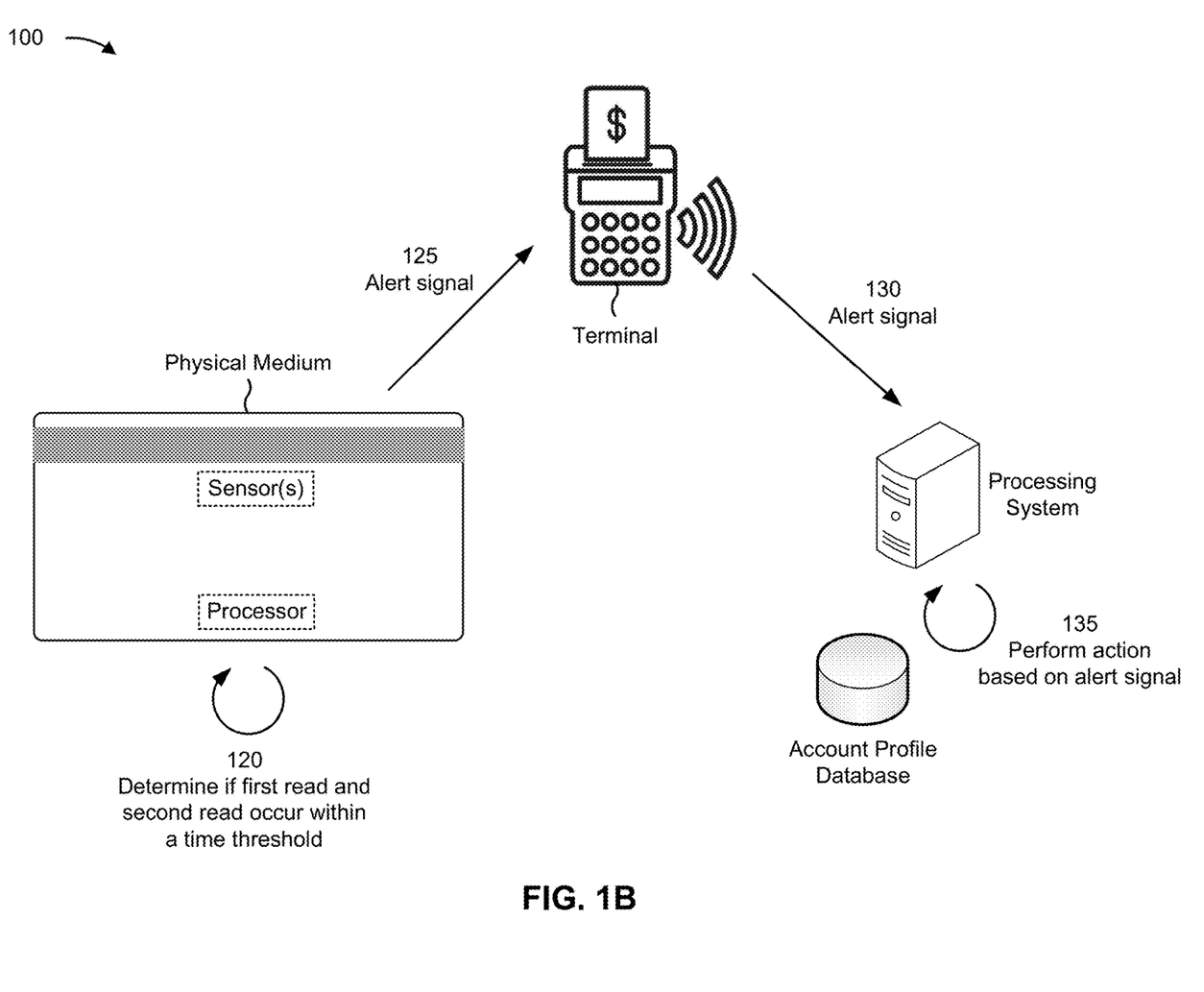

As shown in FIG. 1B, and by reference number 120, the physical medium (e.g., the processor of the physical medium) may determine if the first read and the second read occur within a time threshold (e.g., 0.5 seconds, 1 second, or 2 seconds) of each other. The time threshold may be representative of a minimum length of time that a person may be able to swipe/insert the physical medium through/into the card reader of the terminal two separate times (e.g., if there was an error reading the magnetic stripe the first time). Accordingly, the first read and the second read occurring within the time threshold may indicate that the physical medium has potentially been skimmed by a card skimming device in addition to being read by the card reader.

As shown by reference number 125, if the first read and the second read occur within the time threshold of each other, then the physical medium (e.g., the processor of the physical medium) may transmit a physical medium alert signal to the terminal. The physical medium alert signal may indicate a potential threat associated with the user account (e.g., that the physical medium has been skimmed) and/or with the terminal (e.g., that the terminal may have a card skimming device in the card reader).

Additionally, or alternatively, in implementations in which the physical medium includes a first sensor and a second sensor, the processor may transmit the physical medium alert signal when the processor receives the first signal from the first sensor and the second signal from the second sensor. In some implementations, the first sensor and the second sensor may be configured to measure different measurements. For example, the first sensor may measure voltage, and the second sensor may measure capacitance. If the processor receives a signal from the first sensor indicating a voltage measurement that exceeds the corresponding voltage threshold value, but not a signal from the second sensor that a capacitance measurement exceeds the corresponding capacitance threshold value, then the processor will take no action (e.g., there is no indication of card skimming). If the processor receives both voltage and capacitance measurements having values that exceed the corresponding threshold values, then the processor may transmit the physical medium alert signal to the terminal.

As shown by reference number 130, the terminal may transmit, and the processing system (e.g., of a financial institution with which the user account is associated) may receive, a terminal alert signal. The terminal alert signal may be the same as the physical medium alert signal, and may indicate the potential threat associated with the user account and/or with the terminal.

As shown by reference number 135, based on receiving the terminal alert signal, the processing system may access the user account (e.g., from the account profile database on which account information and/or account settings may be stored) and perform one or more actions associated with the user account. For example, the action may be to automatically lock the user account. Additionally, the processing system may transmit a notification to a user device associated with the user account notifying the user of the potential threat to the user account and that the user account has been locked due to the potential threat. The notification may be transmitted as a short message service (SMS) text message and or as an in-application notification (e.g., for an application associated with the financial institution and installed on the user device).

Figure 1C:
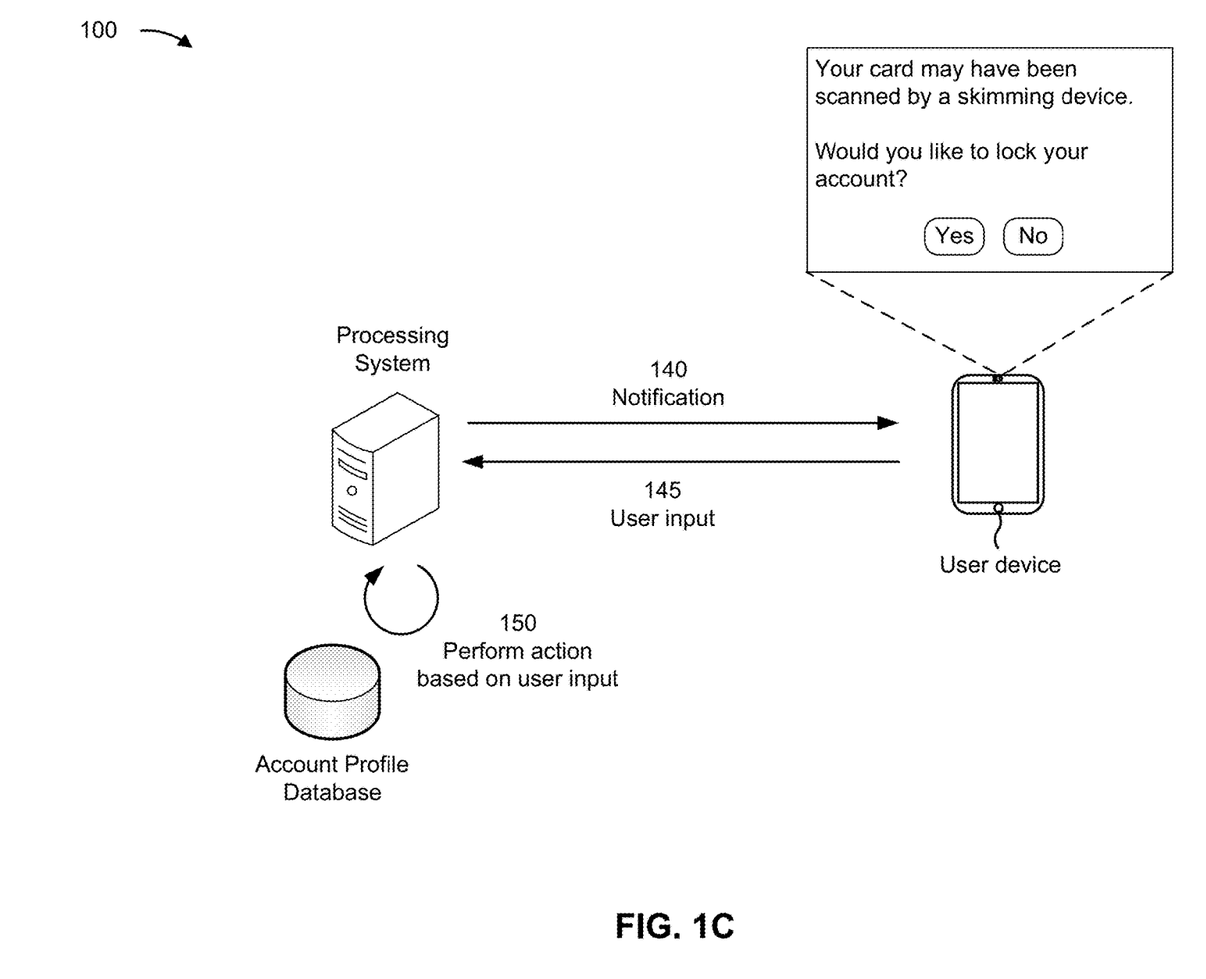

Alternatively, as shown in FIG. 1C, and by reference number 140, the action may be to first transmit a notification to the user device notifying the user of the potential threat to the user account, and request input from the user to perform an action (e.g., a second action) associated with the user account, such as locking the user account. As shown by reference number 145, the processing system may receive a user input to perform the second action. As shown by reference number 150, the processing system may access the user account (e.g., from the account profile database) and perform the second action (e.g., lock the user account).

In some implementations, the processing system may determine whether to automatically lock the user account or to request the user input to lock the account based on one or more factors associated with the user account. One example factor may be an account type of the user account. For example, if the account type is a checking account, then the processing system may automatically lock the account. If the account type is a credit account, then the processing system may first notify the user and request input from the user for further action. Another example factor may be an account total (e.g., account balance). For example, if the account total is above a threshold value (e.g., $5,000), then the processing system may automatically lock the account. If the account total is at or below the threshold value, then the processing system may first notify the user and request input from the user for further action.

In some implementations, the processor of the physical medium may be able to transmit the physical medium alert signal to the user device in addition to or in lieu of to the terminal. The user device may then transmit a user device alert signal to the processing system. The user device alert signal may be the same as the physical medium alert signal, and may indicate the potential threat associated with the user account and/or with the terminal. Additionally, or alternatively, the user device may generate a notification on the user device of the potential threat to the user account and requesting user input on any action to be taken, in a similar manner as described above.

Figure 1D:
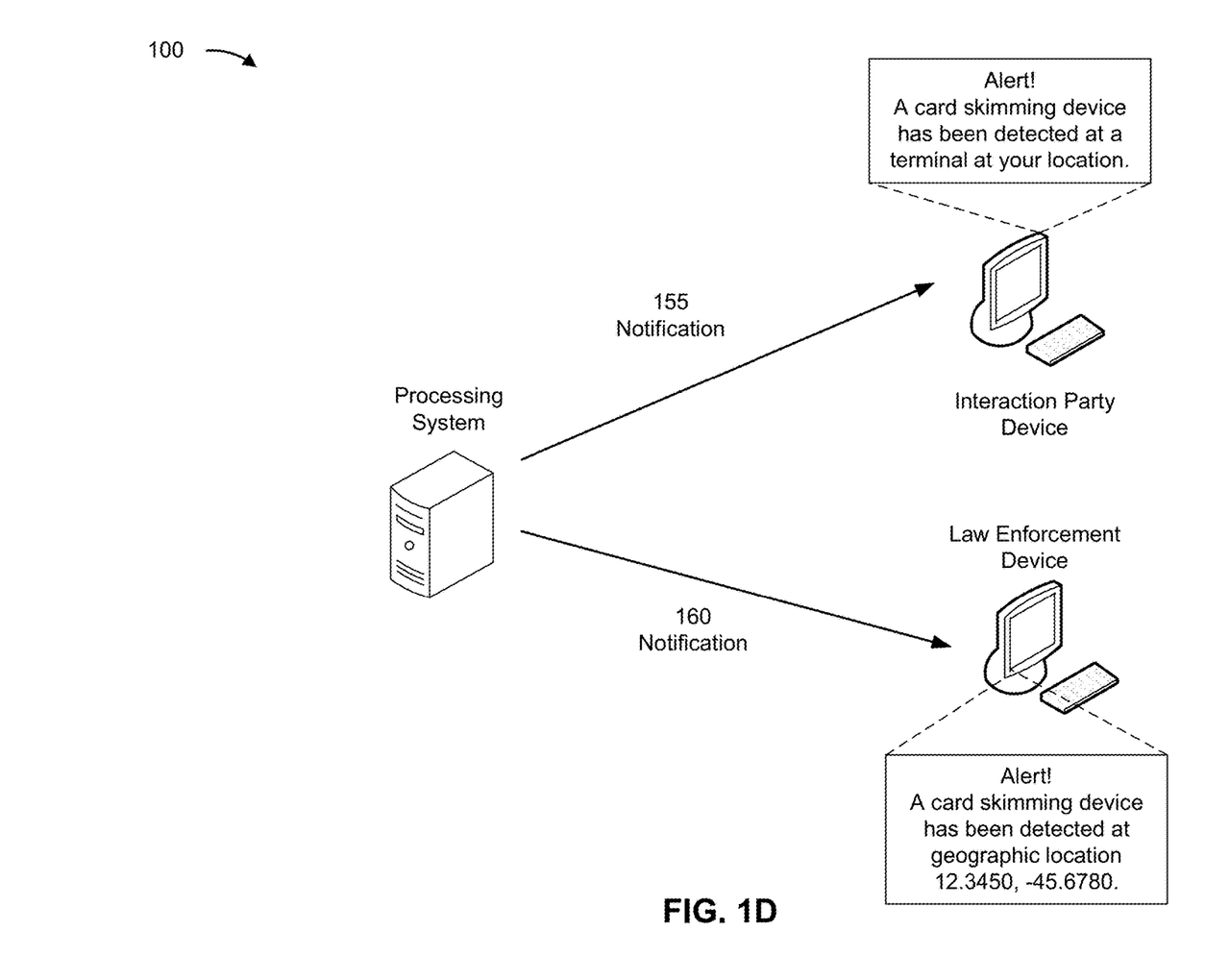

In some implementations, as shown in FIG. 1D, and by reference number 155, the processing system may transmit a notification to an interaction party device of the interaction party. The notification may indicate a potential presence of a skimming device in or on the terminal.

Additionally, or alternatively, as shown by reference number 160, the processing system may transmit a notification to a law enforcement device associated with a local law enforcement agency (e.g., the nearest law enforcement agency). The notification may include a geographic location associated with the terminal and/or a name of the interaction party. The notification may further indicate a potential presence of a skimming device in or on the terminal.

As described above, the physical medium may include one or more sensors that are configured to detect when a magnetic stripe of the physical medium is read (e.g., when the physical medium is swiped or inserted into a card reader of a terminal). When the sensor(s) detect two different reads of the magnetic stripe, and the physical medium determines that the two reads occurred within a time threshold of each other, the physical medium may transmit an alert signal (e.g., the physical medium alert signal) to the terminal, where the alert signal may indicate a potential threat to the user account associated with the physical medium. The terminal may, in turn, transmit an alert signal (e.g., the terminal alert signal) to a processing system, which may perform one or more actions associated with the user account (e.g., locking the user account and/or notifying the user) to prevent or minimize the potential threat. Accordingly, by detecting the card skimming as it occurs, and timely performing actions to prevent unauthorized actions resulting from access to the user account via the card skimming, substantial time and computing resources may be conserved that otherwise may have been necessary to reverse or remedy such unauthorized actions.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
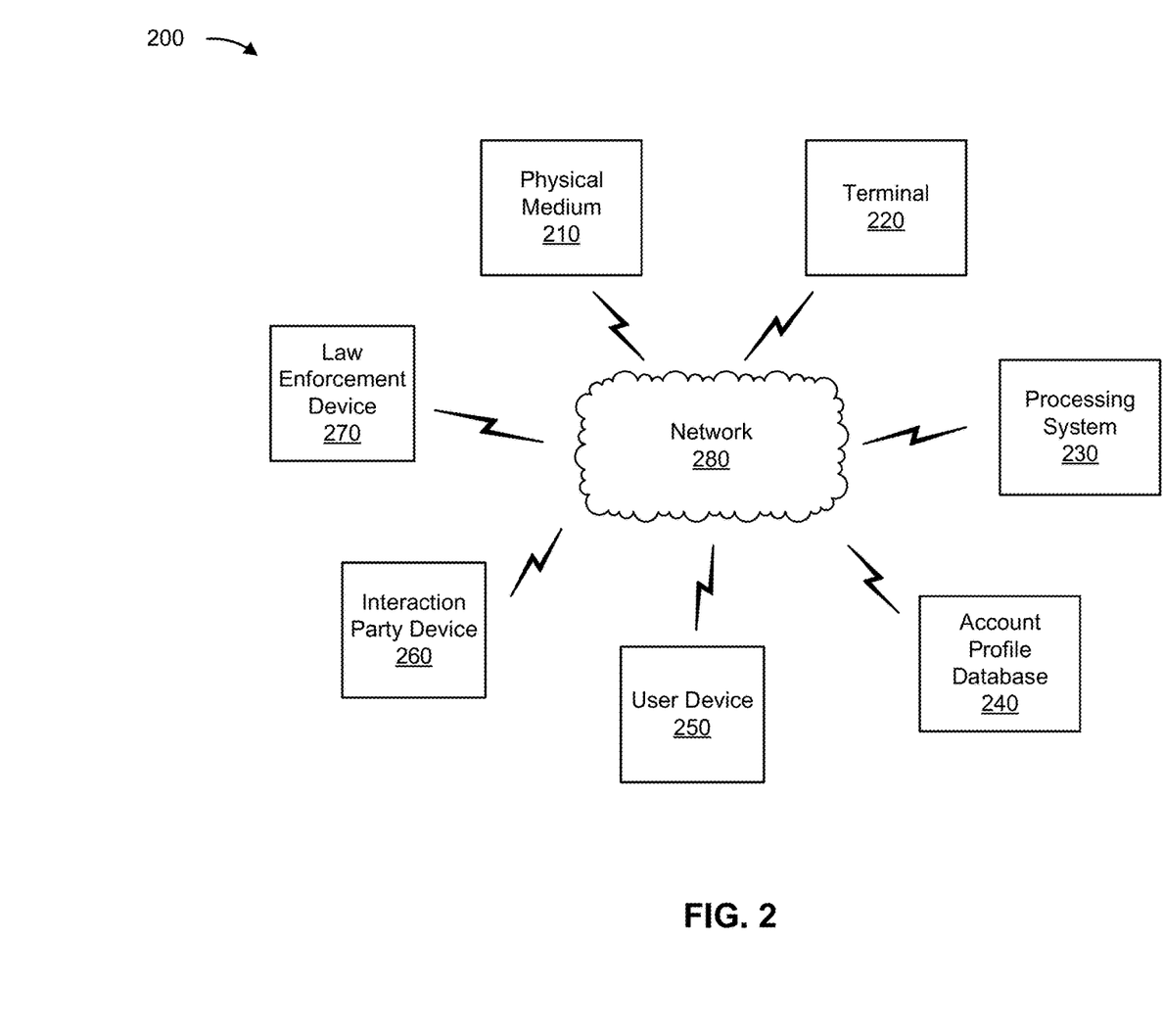
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a physical medium 210, a terminal 220, a processing system 230, an account profile database 240, a user device 250, an interaction party device 260, a law enforcement device 270, and a network 280. Devices of environment 200 may interconnect via wired connections, wireless connections, or a combination of wired and wireless connections.

The physical medium 210 may include one or more devices capable of being used for an electronic transaction. The physical medium 210 may include integrated circuitry capable of storing and communicating account information. For example, the physical medium 210 may be a transaction card, such as a credit card, a debit card, a gift card, an ATM card, a transit card, a fare card, and/or an access card. The physical medium 210 may store account information associated with the physical medium 210, which may be used in connection with an electronic transaction. The account information may include, for example, an account identifier that identifies an account (e.g., a bank account or a credit account) associated with the physical medium 210 (e.g., an account number, a card number, a bank routing number, and/or a bank identifier), a cardholder identifier (e.g., identifying a name of a person, business, or entity associated with the account or the physical medium 210), expiration information (e.g., identifying an expiration month and/or an expiration year associated with the physical medium 210), and/or a credential (e.g., a payment token). In some implementations, the physical medium 210 may store the account information in tamper-resistant memory of the physical medium 210, such as in a secure element. As part of performing an electronic transaction, the physical medium 210 may transmit the account information to a terminal using a communication component, such as a magnetic stripe, an integrated circuit (IC) chip (e.g., a EUROPAY®, MASTERCARD®, VISA® (EMV) chip), and/or a contactless communication component (e.g., a near-field communication (NFC) component, a radio frequency (RF) component, a Bluetooth component, and/or a Bluetooth Low Energy (BLE) component). Thus, the physical medium 210 and the terminal may communicate with one another by coming into contact with one another (e.g., using a magnetic stripe or an EMV chip) or via contactless communication (e.g., using NFC).

The terminal 220 may include one or more devices capable of facilitating an electronic transaction. For example, the terminal 220 may include a PoS terminal, a payment terminal (e.g., a credit card terminal, a contactless payment terminal, a mobile credit card reader, or a chip reader), and/or an automated teller machine (ATM). The terminal 220 may include one or more input components and/or one or more output components to facilitate obtaining data (e.g., account information) from a transaction device (e.g., a transaction card, a mobile device executing a payment application, or the like) and/or to facilitate interaction with and/or authorization from an owner or accountholder of the transaction device. Example input components of the terminal 220 include a number keypad, a touchscreen, a magnetic stripe reader, a chip reader, and/or an RF signal reader (e.g., an NFC reader). Example output devices of terminal 220 include a display and/or a speaker.

The processing system 230 may include one or more devices capable of processing, authorizing, and/or facilitating a transaction. For example, the processing system 230 may include one or more servers and/or computing hardware (e.g., in a cloud computing environment or separate from a cloud computing environment) configured to receive and/or store information associated with processing an electronic transaction. The processing system 230 may process a transaction, such as to approve (e.g., permit, authorize, or the like) or decline (e.g., reject, deny, or the like) the transaction and/or to complete the transaction if the transaction is approved. The processing system 230 may process the transaction based on information received from a terminal, such as transaction data (e.g., information that identifies a transaction amount, a merchant, a time of a transaction, a location of the transaction, or the like), account information communicated to the terminal by a transaction device (e.g., a transaction card, a mobile device executing a payment application, or the like) and/or information stored by the processing system 230 (e.g., for fraud detection).

The processing system 230 may be associated with a financial institution (e.g., a bank, a lender, a credit card company, or a credit union) and/or may be associated with a transaction card association that authorizes a transaction and/or facilitates a transfer of funds. For example, the processing system 230 may be associated with an issuing bank associated with the transaction device, an acquiring bank (or merchant bank) associated with the merchant and/or the terminal, and/or a transaction card association (e.g., VISA® or MASTERCARD®) associated with the transaction device. Based on receiving information associated with the transaction device from the terminal, one or more devices of the processing system 230 may communicate to authorize a transaction and/or to transfer funds from an account associated with the transaction device to an account of an entity (e.g., a merchant) associated with the terminal.

The account profile database 240 may include one or more devices capable of receiving, generating, storing, processing, and/or providing information associated with card skimming detection, as described elsewhere herein. The account profile database 240 may include a communication device and/or a computing device. For example, the account profile database 240 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the account profile database 240 may store user information, account information, and/or account settings, as described elsewhere herein.

The user device 250 may include one or more devices capable of receiving, generating, storing, processing, and/or providing information associated with card skimming detection, as described elsewhere herein. The user device 250 may include a communication device and/or a computing device. For example, the user device 250 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The interaction party device 260 may include one or more devices capable of receiving, generating, storing, processing, and/or providing information associated with card skimming detection, as described elsewhere herein. The interaction party device 260 may include a communication device and/or a computing device. For example, the interaction party device 260 may include a wireless communication device, a mobile phone, a user equipment, a laptop computer, a tablet computer, a desktop computer, or a similar type of device.

The law enforcement device 270 may include one or more devices capable of receiving, generating, storing, processing, and/or providing information associated with card skimming detection, as described elsewhere herein. The law enforcement device 270 may include a communication device and/or a computing device. For example, the law enforcement device 270 may include a wireless communication device, a mobile phone, a user equipment, a laptop computer, a tablet computer, a desktop computer, or a similar type of device.

The network 280 may include one or more wired and/or wireless networks. For example, the network 280 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 280 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
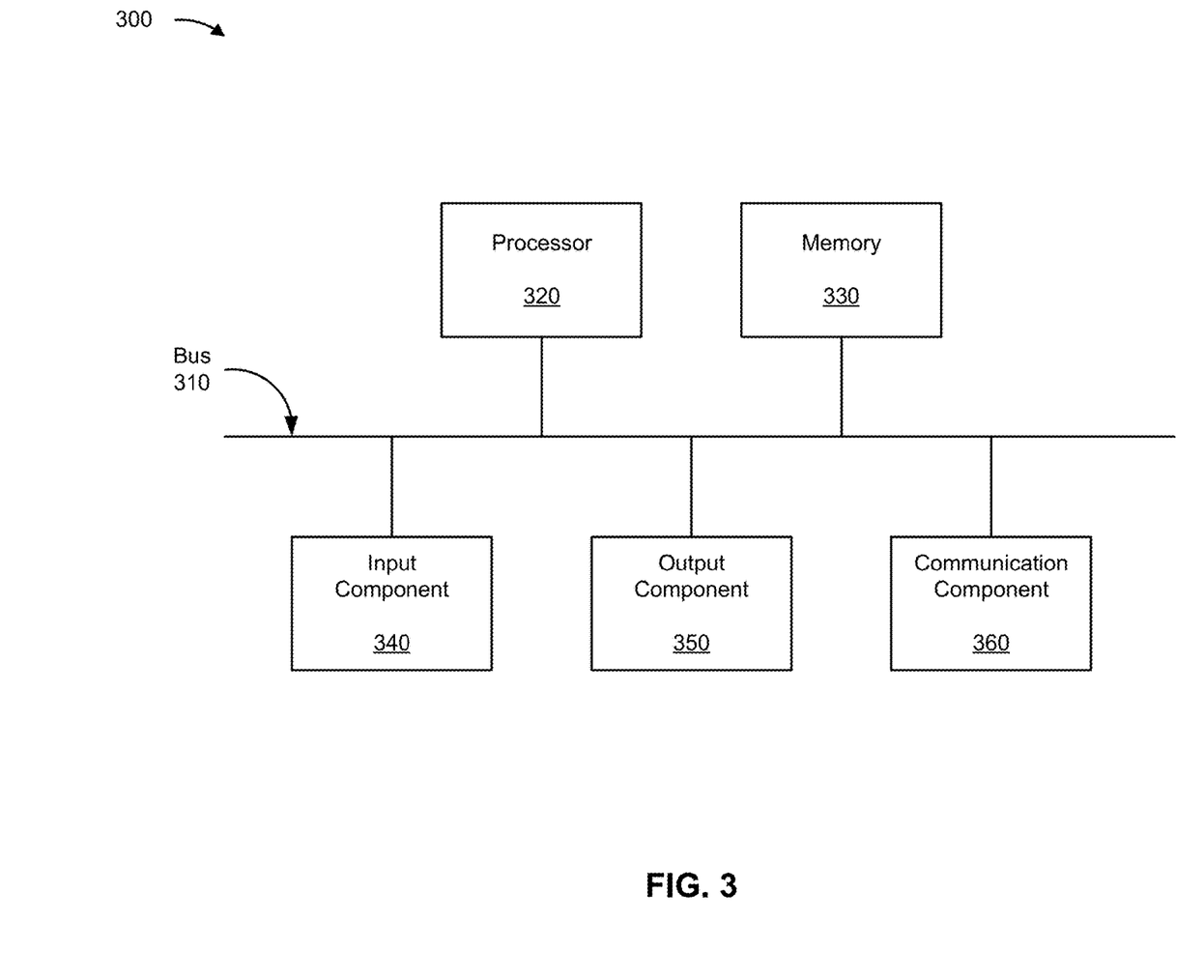
FIG. 3 is a diagram of example components of one or more devices of FIG. 2, in accordance with some embodiments of the present disclosure.

FIG. 3 is a diagram of example components of a device 300, which may correspond to the physical medium 210, the terminal 220, the processing system 230, the account profile database 240, the user device 250, the interaction party device 260, and/or the law enforcement device 270. In some implementations, the physical medium 210, the terminal 220, the processing system 230, the account profile database 240, the user device 250, the interaction party device 260, and/or the law enforcement device 270 include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 may enable device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
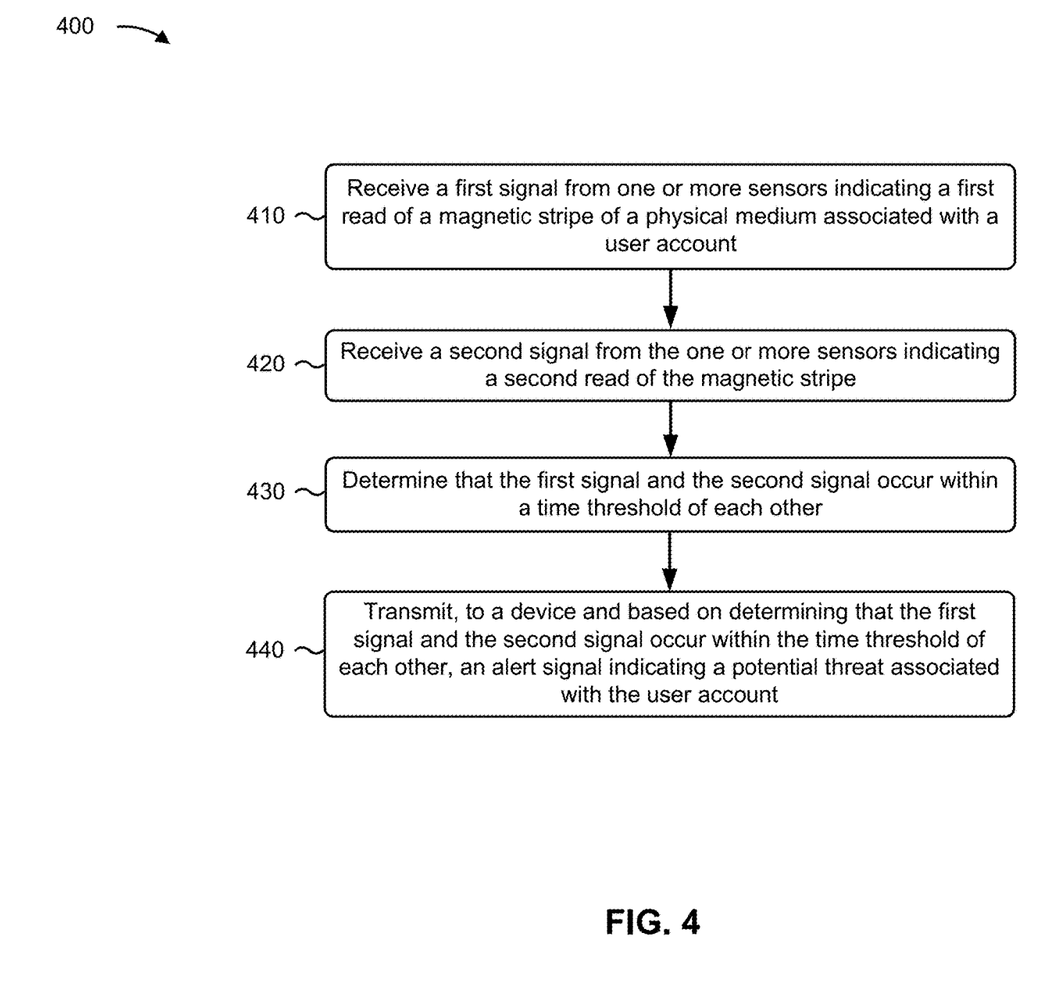
FIGS. 4 and 5 are flowcharts of example processes relating to card skimming detection, in accordance with some embodiments of the present disclosure.

FIG. 4 is a flowchart of an example process 400 associated with card skimming detection. In some implementations, one or more process blocks of FIG. 4 may be performed by the physical medium 210. In some implementations, one or more process blocks of FIG. 4 may be performed by another device or a group of devices separate from or including the physical medium 210, such as the terminal 220. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a first signal from one or more sensors, of the physical medium 210, indicating a first read of a magnetic stripe of the physical medium (block 410). For example, the physical medium 210 (e.g., using processor 320, memory 330, input component 340, and/or communication component 360) may receive a first signal from the one or more sensors indicating a first read of the magnetic stripe, as described above in connection with reference number 110 of FIG. 1A. As an example, the sensor(s) of the physical medium may detect the first read of the magnetic stripe, and may transmit, to the processor of the physical medium, the first signal indicating the first read.

As further shown in FIG. 4, process 400 may include receiving a second signal from the one or more sensors, of the physical medium 210, indicating a second read of the magnetic stripe of the physical medium 210 (block 420). For example, the physical medium 210 (e.g., using processor 320, memory 330, input component 340, and/or communication component 360) may receive a second signal from the one or more sensors indicating a second read of the magnetic stripe, as described above in connection with reference number 115 of FIG. 1A. As an example, the sensor(s) of the physical medium may detect the second read of the magnetic stripe, and may transmit, to the processor of the physical medium, the second signal indicating the second read.

As further shown in FIG. 4, process 400 may include determining that the first read and the second read occur within a time threshold of each other (block 430). For example, the physical medium 210 (e.g., using processor 320 and/or memory 330) may determine that the first read and the second read occur within a time threshold of each other, as described above in connection with reference number 120 of FIG. 1B. As an example, the processor of the physical medium may determine that the first read and the second read of the physical medium occur within the time threshold of each other.

As further shown in FIG. 4, process 400 may include transmitting, to a device and based on determining that the first read and the second read occur within the time threshold of each other, an alert signal indicating a potential threat associated with the user account (block 440). For example, the physical medium 210 (e.g., using processor 320, memory 330, and/or communication component 360) may transmit, to a device and based on determining that the first read and the second read occur within the time threshold of each other, an alert signal indicating a potential threat associated with the user account, as described above in connection with reference number 125 of FIG. 1B. As an example, the physical medium may transmit, to the terminal, a physical medium alert signal indicating the potential threat associated with the user account.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

Figure 5:
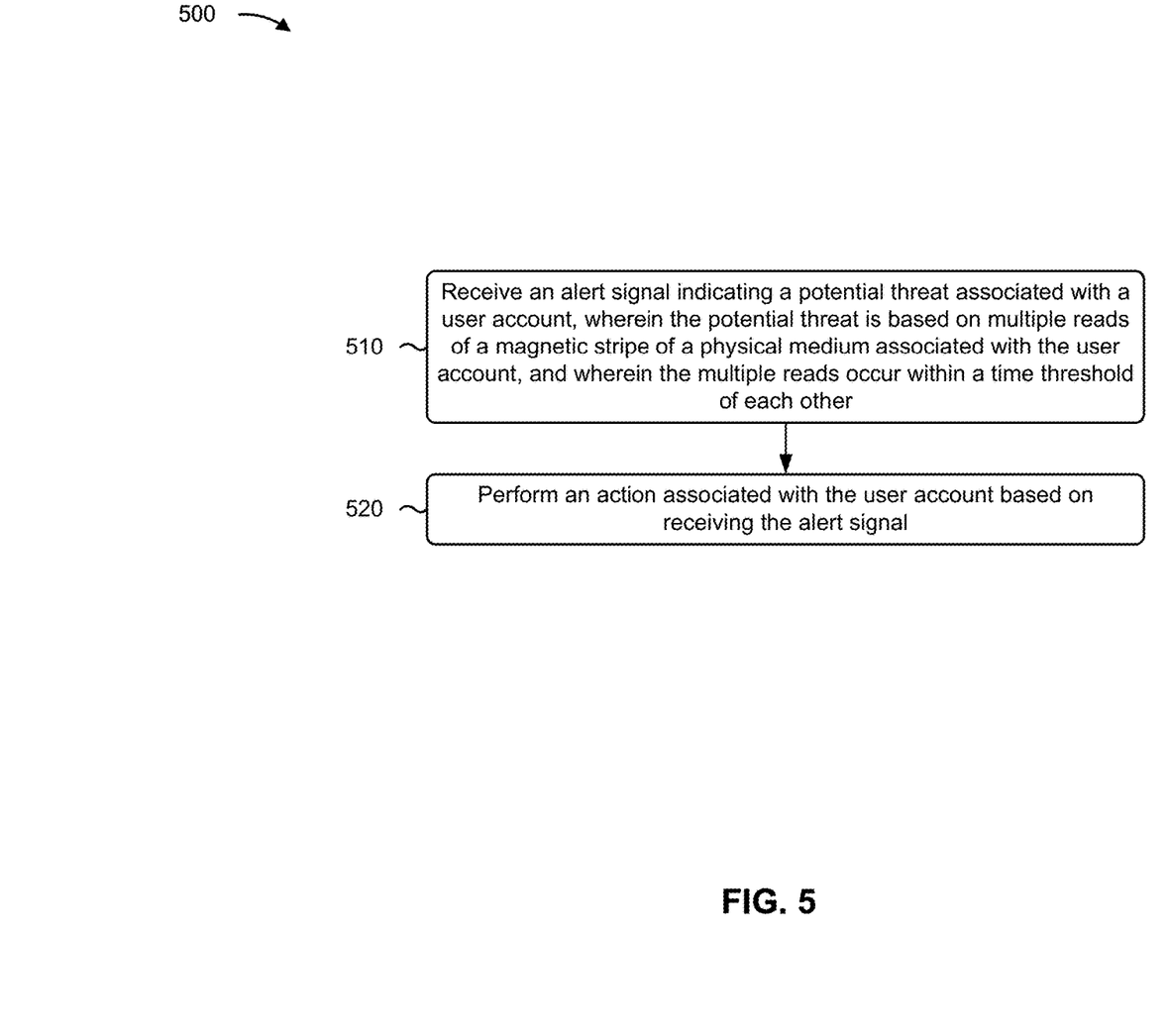

FIG. 5 is a flowchart of an example process 500 associated with card skimming detection. In some implementations, one or more process blocks of FIG. 5 may be performed by the processing system 230. In some implementations, one or more process blocks of FIG. 5 may be performed by one or more components of the device 300, such as processor 320, memory 330, input component 340, output component 350, and/or communication component 360.

As shown in FIG. 5, process 500 may include receiving, from a device, an alert signal indicating a potential threat associated with a user account (block 510). For example, the processing system 230 (e.g., using processor 320, memory 330, input component 340, and/or communication component 360) may receive an alert signal indicating a potential threat associated with a user account, as described above in connection with reference number 130 of FIG. 1B. As an example, the processing system may receive a terminal alert signal from the terminal indicating the potential threat associated with the user account.

In some implementations, the potential threat may be based on multiple reads of a magnetic stripe of a physical medium associated with the user account. In some implementations, the multiple reads may have occurred within a time threshold of each other.

As further shown in FIG. 5, process 500 may include performing an action associated with the user account based on receiving the alert signal (block 520). For example, the processing system 230 (e.g., using processor 320 and/or memory 330) may perform an action associated with the user account based on receiving the alert signal, as described above in connection with reference number 135 of FIG. 1B. As an example, the processing system may access the user account (e.g., from the account profile database) and lock the account based on receiving the terminal alert signal.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1D. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for card skimming detection, the system comprising:
 a physical medium that includes:
  a magnetic stripe on which account information associated with a user account is stored;
  one or more sensors configured to detect when information is read from the magnetic stripe; and
  a processor configured to:
   receive a first signal from a first sensor, of the one or more sensors, indicating a first read of the magnetic stripe, wherein the first read is detected by the first sensor;
   receive a second signal from a second sensor, of the one or more sensors, indicating a second read of the magnetic stripe, wherein the second read is detected by the second sensor;
   determine that the first read, detected by the first sensor, and the second read, detected by the second sensor, occur within a time threshold of each other, wherein the time threshold is representative of a minimum length of time associated with physically interfacing the physical medium with a card reader two separate times; and
   transmit, to a device and based on determining that the first read, detected by the first sensor, and the second read, detected by the second sensor, occur within the time threshold of each other, an alert signal indicating a potential threat associated with the user account; and
 a processing system that includes:
  one or more memories; and
  one or more processors, communicatively coupled to the one or more memories, configured to:
   receive, from the device, the alert signal; and
   perform an action associated with the user account based on receiving the alert signal.

2. The system of claim 1, wherein the action includes transmitting a notification to a user device associated with the user account, and
 wherein the notification indicates the potential threat associated with the user account, and the notification requests input from a user of the user device to perform a second action.

3. The system of claim 2, wherein the one or more processors of the processing system are further configured to:
 receive the input from the user device; and
 lock the user account based on the input from the user device.

4. The system of claim 1, wherein the action includes locking the user account.

5. The system of claim 4, wherein the one or more processors of the processing system are further configured to:
 transmit a notification to a user device associated with the user account, wherein the notification indicates that the user account has been locked due to the potential threat.

6. The system of claim 1, wherein the device is a terminal of an interaction party,
 wherein the action includes transmitting a notification to an interaction party device of the interaction party, and
 wherein the notification indicates a potential presence of a skimming device in or on the terminal.

7. The system of claim 1, wherein the device is a terminal, and one of the first read, detected by the first sensor, or the second read, detected by the second sensor is performed by the terminal, wherein the action includes transmitting a notification to a law enforcement device associated with a law enforcement agency, and
 wherein the notification indicates a potential presence of a skimming device in or on the terminal, and the notification includes a geographic location associated with the terminal.

8. The system of claim 1, wherein
 the processor of the physical medium is configured to transmit the alert signal when the processor receives the first signal from the first sensor and the second signal from the second sensor.

9. A physical medium for card skimming detection, the physical medium comprising:
 a magnetic stripe on which information associated with a user account is stored;
 one or more sensors configured to detect when the information is read from the magnetic stripe; and
 a processor configured to:
  receive a first signal from a first sensor, of the one or more sensors, indicating a first read of the magnetic stripe, wherein the first read is detected by the first sensor;
  receive a second signal from a second sensor, of the one or more sensors, indicating a second read of the magnetic stripe, wherein the second read is detected by the second sensor;
  determine that the first read, detected by the first sensor, and the second read, detected by the second sensor, occur within a time threshold of each other, wherein the time threshold is representative of a minimum length of time associated with physically interfacing the physical medium with a card reader two separate times; and
  transmit, to a device and based on determining that the first read, detected by the first sensor, and the second read, detected by the second sensor, occur within the time threshold of each other, an alert signal indicating a potential threat associated with the user account.

10. The physical medium of claim 9, wherein
 the processor is configured to transmit the alert signal when the processor receives the first signal from the first sensor and the second signal from the second sensor.

11. The physical medium of claim 9, wherein one of the first read, detected by the first sensor, or the second read, detected by the second sensor, is performed by a terminal, and
 wherein the processor, to transmit the alert signal, is configured to transmit the alert signal to the terminal.

12. The physical medium of claim 9, wherein the processor configured to transmit the alert signal, is configured to transmit the alert signal to a user device associated with the user account.

13. A method of card skimming detection, comprising:
receiving, by a processor of a physical medium and from a first sensor of one or more sensors of the physical medium, a first signal indicating a first read of a magnetic stripe of the physical medium,
 wherein information associated with a user account is stored on the magnetic stripe,
 wherein the one or more sensors are configured to detect when the information is read from the magnetic stripe, and
 wherein the first read is detected by the first sensor;
receiving, by the processor and from a second sensor of the one or more sensors, a second signal indicating a second read of the magnetic stripe,
 wherein the second read is detected by the second sensor;
determining, by the processor and based on receiving the first signal and the second signal, that the first read, detected by the first sensor, and the second read, detected by the second sensor, occur within a time threshold of each other, wherein the time threshold is representative of a minimum length of time associated with physically interfacing the physical medium with a card reader two separate times;
receiving, from the processor, based on the determining, and by a system having one or more processors, an alert signal indicating a potential threat associated with the user account; and
performing, by the system, an action associated with the user account based on receiving the alert signal.

14. The method of claim 13, wherein the action includes transmitting a notification to a user device associated with the user account, and
 wherein the notification indicates the potential threat associated with the user account, and the notification requests input from a user of the user device to perform a second action.

15. The method of claim 14, further comprising:
receiving the input from the user device; and
locking the user account based on the input from the user device.

16. The method of claim 13, wherein the action includes locking the user account.

17. The method of claim 16, further comprising:
transmitting a notification to a user device associated with the user account, wherein the notification indicates that the user account has been locked due to the potential threat.

18. The method of claim 13, wherein one of the first read, detected by the first sensor, or the second read, detected by the second sensor, is performed by a terminal associated with an interaction party, wherein the action includes transmitting a notification to an interaction party device of the interaction party, and
 wherein the notification indicates a potential presence of a skimming device in or on the terminal.

19. The method of claim 13, wherein one of the first read, detected by the first sensor, or the second read, detected by the second sensor, is performed by a terminal associated with an interaction party, wherein the action includes transmitting a notification to a law enforcement device associated with a law enforcement agency, and
 wherein the notification indicates a potential presence of a skimming device in or on the terminal, and the notification includes a geographic location associated with the terminal.

20. The method of claim 13, wherein receiving the alert signal comprises receiving the alert signal from a user device associated with the user account.

* * * * *